United States Patent Office 3,817,901
Patented June 18, 1974

---

3,817,901
PROCESS FOR PREPARING A NEW SUBSTANCE THAT IS SUITABLE FOR USE AS A PLASTICIZER IN POLYMERIC COMPOUNDS
Sijbrandus E. Schaafsma, Beek, Netherlands, assignor to Stamicarbon N.V., Heerlen, Netherlands
No Drawing. Filed May 12, 1972, Ser. No. 252,895
Claims priority, application Netherlands, May 14, 1971, 7106621
Int. Cl. C08f 45/42, 45/34
U.S. Cl. 260—31.4 R  5 Claims

ABSTRACT OF THE DISCLOSURE

Diesters of the formula

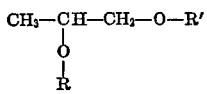

wherein one of R and R' is $$-CH_2-CH_2-OR''$$

and the other of R and R' is R''', wherein one of R'' and R''' is

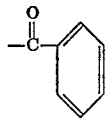

and the other of R'' and R''' is

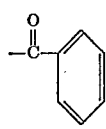

or

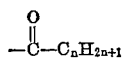

wherein $n$ is a number from 5 to 11, and process for making same, are disclosed. The use of these diesters as plasticizers in organic polymers, such as acrylic polymers and vinyl polymers, is also disclosed.

BACKGROUND OF THE INVENTION

U.S. Pat. 2,956,978 discloses the use of diethylene glycol dibenzoate and dipropylene glycol dibenzoate as plasticizers for organic polymers. Such plasticizer use of diethylene glycol dibenzoate has a disadvantage in that that diester has a high melting point (29.1° C.). Dipropylene glycol dibenzoate is a good plasticizer for certain organic polymers such as polyvinyl chloride, but has the drawback that for certain applications the resulting plasticized polyvinyl chloride has insufficient flexibility at low temperatures.

U.S. Pat. 2,764,571 discloses the use of a combination of diethylene glycol dibenzoate and dipropylene glycol dibenzoate (especially in a ratio of 10–70 percent by weight of diethylene glycol dibenzoate to 90–30 percent by weight of dipropylene glycol dibenzoate) for plasticizing polyvinyl chloride and copolymers of vinyl chloride with at most 40 mole percent of vinylidene chloride or vinyl acetate. The use of this plasticizer combination results in a plasticizer which is less volatile than either of the dialkylene glycol dibenzoates used separately, but the combination has the same drawback as dipropylene glycol dibenzoate alone.

SUMMARY OF THE INVENTION

Organic polymers, such as, e.g. vinyl chloride homopolymers and copolymers, are plasticized with a diester of the formula

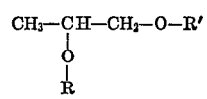

wherein one of R and R' is $$-CH_2-CH_2-OR''$$

and the other of R and R' is R''' wherein one of R'' and R''' is

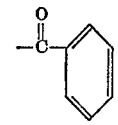

and the other of R'' and R''' is

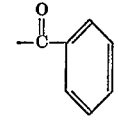

or

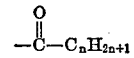

wherein $n$ is a number from 5 to 11. The diester is basically a diester of 1-(2-hydroxyethoxy)propanol-2 or 2-(2-hydroxyethoxy)propanol-1. The two ester groups of the diester are both derived from benzoic acid, or else one ester group is derived from benzoic acid and the other group is derived from a saturated aliphatic carboxylic acid of 6–12 carbon atoms, such as pelargonic acid. Preferably, the diesters are produced by esterifying 1-(2-hydroxyethoxy)propanol-2 or 2-(2-hydroxyethoxy)propanol-1 or mixtures thereof with benzoic acid or a mixture of benzoic acid and a saturated aliphatic carboxylic acid of 6–12 carbon atoms at a temperature of about 200 to about 300° C. with removal of water from the esterification zone.

DESCRIPTION OF THE INVENTION

The present invention relates to new diesters, the process for making same, and the use of same as plasticizers in organic polymers.

Diesters of the formula

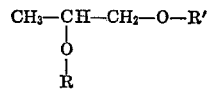  FORMULA I wherein one of R and R' is $$-CH_2-CH_2-OR'' \quad \text{FORMULA II}$$
$$-CH_2-CH_2-OR' \quad \text{FORMULA III}$$

and the other of R and R' is R''' wherein one of R'' and R''' is

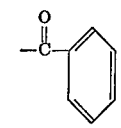  FORMULA IV and the other of R'' and R''' is

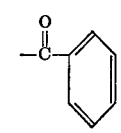

or

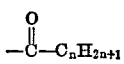 FORMULA V wherein $n$ is a number from 5 to 11, are prepared by producing a diester from 1-(2-hydroxyethoxy)propanol-2 or 2-(2-hydroxyethoxy)propanol-1 or mixtures thereof by esterifying both hydroxyl groups with benzoic acid, or by esterifying one hydroxyl group with benzoic acid and the other hydroxyl group with a saturated aliphatic carboxylic acid of 6–12 carbon atoms.

The two (hydroxyethoxy)propanols mentioned above are the two isomers of ethylene-propylene glycol, wherein the primary and the secondary hydroxyl groups, respectively, of propylene glycol are etherified with a hydroxyl group of ethylene glycol.

Diesters for Formula I are novel. These diesters can be prepared using known methods for analogous compounds. For instance, either one of these two isomers of ethylene-propylene glycol, or a mixture of these isomers, can be esterified with benzoic acid and, if indicated, the saturated aliphatic carboxylic acid, in the presence or absence of a catalyst and/or with simultaneous removal of water produced as a reaction product. The ethylene-propylene glycols, or mixtures of these glycols, may be reacted with benzoyl chloride and/or the acid chloride of the saturated aliphatic carboxylic acid at a temperature of 50 to 175° C., preferably 80–125° C., with removal of hydrogen chloride by product during the reaction. A catalyst is not required. Another possibility is the reaction of one or both isomers of ethylene-propylene glycol with an alkyl benzoate and/or an alkyl ester of the saturated aliphatic carboxylic acid at a preferred temperature of 150 to 180° C. in the presence of an alkali or earth alkali metal oxide, e.g. calcium oxide, as a catalyst.

The preferred process, however, in which a high grade product is obtained in high yields and with high conversion efficiencies, involves the reaction of 1-(2-hydroxyethoxy) propanol-2 or 2-(2-hydroxyethoxy) propanol-1 or mixtures thereof with benzoic acid or a mixture of benzoic acid and a saturated aliphatic carboxylic acid of 6–12 carbon atoms at a temperature of about 200 to about 300° C., with removal of water from the esterification zone during at least a portion of the esterification. It is remarkable that in this process the use of relatively high esterification temperatures does not adversely affect the color of the resulting diester. A very high yield of diester can be obtained at a sufficiently high reaction rate without requiring the presence of a catalyst and without the use of expensive acid chlorides. In addition, no special measures are required for the removal of the water produced during the esterification. The absence of an acid catalyst and the fact that acid by-products are not formed, in distinction to the reaction between ethylene-propylene glycol and benzoyl chloride, permits cheaper materials of construction to be used for the esterification apparatus. In this preferred esterification process, the reaction water is readily separated from the reaction mixture during the esterification by evaporation. Preferably, the esterification temperature is between 210 and 265° C., as with temperatures of this range the best reaction rates and diester yields are obtained. The esterification reaction is conveniently conducted at atmospheric pressure, although higher and lower pressures may be used if desired. It is preferred, but not required, that the reaction proceed in an inert atmosphere, such as under nitrogen.

The benzoic acid and/or saturated aliphatic carboxylic acid will be used in at least stoichiometric amounts in the esterification reaction. Less acid can be used, but will result in incomplete conversion of the difficulty recoverable ethylene propylene glycol. Preferably, a slight excess of the acid or acids will be used in order to insure complete conversion of the glycol. Therefore, about 2.01 moles of acid will be used per mole of ethylene-propylene glycol, and there is no real upper limit of the acid excess which can be used. For instance, 10 moles or 100 moles or even higher of acid may be used per mole of ethylene-propylene glycol. It will be readily appreciated, however, that the use of such large excesses of acid do not provide any advantage and generally result in increased costs. If a mixture of acids are used in the esterification reaction, generally the acids will be present in about equal molar amounts, although this will vary depending upon the particular diesters desired.

If impure starting materials are utilized, it may be desirable to discolor the resulting diester product by treating same with a mild oxidizing acid. The oxidizing agent may be, for instance, a dilute acidic or basic potassium permanganate solution. Normally, the oxidizing agent will be used in only small amounts, such as 0.2 to 2 mole percent, based on the moles of diester product.

When a mixed benzoic acid-aliphatic acid diester is prepared, the two acids normally are added in one portion each or as a mixture at the beginning of the reaction. A step-wise addition of the two different acids during the reaction is possible, but normally not advantageous.

The diesters of Formula I above are particularly suitable for use as a plasticizer in organic polymers. Normally, the diesters will be used in an amount of from 20 to 70 parts by weight, based on 100 parts by weight of the polymer to be plasticized, preferably from 30 to 50 parts by weight. The diesters may be used in combination with other plasticizers. The organic polymers which are plasticized include cellulosic polymers, such as ethyl cellulose, cellulose acetate butyrate and cellulose nitrate, vinyl polymers such as polyvinyl chloride, polyvinylidene chloride, polyvinyl acetate, polyvinyl butyral and the like, and copolymers of vinyl chloride, vinylidene chloride, vinyl acetate and the like with each other and with up to 40 mole percent of copolymerizable monomers. In addition, acrylic polymers, such as polymethyl methacrylate, can be plasticized with the diesters of the present invention.

The diester plasticizer of Formula I is incorporated in the organic polymer by conventional methods such as milling or use of a heated roll.

It has surprisingly been found that the properties of the diesters of Formula I as plasticizers are considerably better than those of the known plasticizers acknowledged above, e.g. diethylene glycol dibenzoate, dipropylene glycol dibenzoate and mixtures thereof. This improvement is noted particularly in the plasticizing properties of the diesters of the present invention, which produce improved flexibility of the organic polymers which have been plasticized therewith, as compared to the same organic polymers that have been plasticized with the above mentioned known plasticizers. The improved flexibility of the plasticized polymer composition is apparent from the lower elasticity modulus and the lower hardness number while the tensile strength of the resulting composition is higher. In addition, the low temperature behavior of the plasticized polymer compositions of the present invention is better than that of polymer compositions based on the aforementioned known plasticizers. This improvement in the compositions of the present invention is illustrated by the lower brittleness temperature and the lower coldflex temperature of the plasticized polymer compositions containing the diesters of the present invention. The volatility of the plasticizers of Formula I is of the same order of magnitude as the volatility of the known plasticizers acknowledged above. The diester plasticizers of the present invention remain liquid substances even at relatively low temperatures, e.g. −30° C.

The diesters of Formula I wherein one ester group is derived from benzoic acid and the other ester group is derived from a saturated aliphatic carboxylic acid provide better flexibility to the plasticized polymer composition than the corresponding diester, both of whose ester groups are derived from benzoic acid. In particular, the mixed diesters of benzoic acid and pelargonic acid exhibit excellent plasticizing properties. However, the diesters in which the two ester groups are both derived from benzoic acid are cheaper than the mixed diesters, and the question of which diester is most desired for a given plasticizing application will depend upon the particular requirements of the final plasticized polymer composition.

EXAMPLES OF THE INVENTION

The invention will be understood more readily by reference to the following examples; however, these examples are intended to illustrate the invention and are not to be construed to limit the scope of the invention.

In the following examples, the elasticity modulus and the tensile strength were determined according to I.S.O. (International Standards Organisation) Recommendation 527, Type 2. The Shore hardness was determined according to ASTM D 1706. The cold-flex temperature was determined according to B.S. (British Standards) 2782, method 104B. The brittleness temperature was determined according to I.S.O. Draft Recommendation No. 822.

Example 1

Preparation of ethylene-propylene glycol dibenzoate 1550 g. of ethylene glycol (25 moles) and 2 g. of concentrated sulphuric acid were introduced into a 3-liter flask provided with a stirrer and a reflux cooler. The flask contents were brought to 35° C. and then 580 g. of 1,2-epoxypropane (10 moles) were added dropwise with stirring in ½ hours, during which time the flask contents were maintained at 35° C. The reaction mixture was stirred for another 1½ hours at 35° C., and then cooled to room temperature. The flask contents were neutralized by the addition of 1.5 g. of calcium hydroxide and then distilled at 12 mm. Hg ($n_D^{20}$=1.442). The product which weighed 659 g., consisted of a mixture of the two isomers of ethylene-propylene glycol, in a proportion of 66% by weight of 1-(2-hydroxyethoxy)propanol-2 and 34% by weight of 2-(2-hydroxyethoxy)propanol-1.

120 g. of this ethylene-propylene glycol mixture (1 mole) was added to 256 g. of benzoic acid (2.1 moles) in a 1-liter flask provided with a stirrer, a gas feed tube and a distillation head. The reaction mixture was rapidly heated to about 210° C. with stirring and introduction of nitrogen gas. The reaction contents were maintained under a nitrogen atmosphere with the temperature gradually raised to 255° C. over a period of 3 hours, with stirring, and maintained at 255° C. with stirring for another two hours. During this time, a portion of the water of reaction was evaporated.

The resulting reaction mixture was cooled to about 80° C. and washed successively with 100 milliliters of 4% by weight sodium hydroxide solution, 200 milliliters of a 5% by weight sodium carbonate solution, 100 milliliters of water and then another 100 milliliters of water. The reaction mixture was dried by azeotropic distillation with benzene at atmospheric pressure, and then filtered through diatomaceous earth. The resulting product was essentially colorless (Hazen color 22°) and had a low acid content ($a$<0.01 milligram equivalent per gram) and a refractive index: $n_D^{25}$=1.5330. The liquid reaction product solidified to a glass at a temperature below −40° C.

The aqueous layers obtained in the above washing with sodium hydroxide solution and sodium carbonate solution were combined and then acidified to a pH of about 2 by the addition of sulphuric acid. The benzoic acid which precipitated was washed with water and dried to yield 30 g. of benzoic acid.

The yield of the diester was 97% with respect to the benzoic acid consumption and 90% with respect to the original amount of the ethylenepropylene glycol. The product was the dibenzoic acid ester of the two ethylene-propylene glycol isomers.

Example 2

Plasticizing PVC with ethylene-propylene glycol dibenzoate

This example relates to the use of the reaction product of Example 1, hereinafter referred to as ethylenepropylene glycol dibenzoate or EPGDB, as a plasticizer for polyvinyl chloride. The EPGDB was compared in plasticizing effect with dipropylene glycol dibenzoate (DPGDB).

100 parts by weight of polyvinyl chloride, type Solvic 239, were mixed with 50 parts by weight of EPGDB or DPGDB and two parts by weight of a barium cadmium stabilizer known as Flomax 25, on a heated roller (maintained at about 160° C.). The rolled sheet obtained was pressed into test specimens, which were tested for physical properties, with the results of such tests reported in the table below:

|  | EPGDB | DPGDB |
|---|---|---|
| Elasticity modulus, kg./cm.² (at 100% elongation) | 129 | 159 |
| Tensile strength, kg./cm.² | 289 | 233 |
| Hardness, Shore A | 79 | 82 |
| Cold-flex temperature, ° C | −7 | +1 |
| Brittleness temperature, ° C | −7 | +3 |

Example 3

Preparation and use of ethylenepropylene glycol benzoate pelargonate

In a 1-liter flask provided with a stirrer, a gas feed tube and a distillation head, 120 grams (1 mole) of a mixture of the two isomers of ethylene propylene glycol (preparation see Example 1) were added to 158 grams (1 mole) of pelargonic acid and 134 grams (1.1 mole) of benzoic acid. The reaction mixture was rapidly heated to about 200° C. with stirring and introduction of nitrogen gas. The reaction contents were maintained under a nitrogen atmosphere with the temperature gradually raised to 255° C. over a period of 3 hours, with stirring, and maintained at this temperature with stirring for another two hours. During this time, a portion of the water of reaction was evaporated.

The resulting reaction mixture was cooled to about 80° C. and washed successively with sodium hydroxide solution, sodium carbonate solution and water in the same manner as described in Example 1. The reaction mixture was dried by azeotropic distillation with benzene at atmospheric pressure, and then filtered through diatomaceous earth.

The resulting product was essentially colourless and had an acid content of 0.01 milligram equivalent per gram. The refractive index $n_D^{25}$=1.4775. The ester yield was 92% based on the original amount of ethylene propylene glycol.

The reaction product has excellent properties as a plasticizer in polyvinyl chloride and other polymeric compounds.

What is claimed is:

1. A plasticized polymeric composition comprising a film-forming polymer of vinyl chloride and a plasticizing amount of at least one diester of the formula

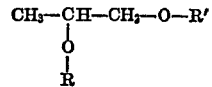

wherein one of R and R' is

and the other of R and R' is R''', wherein one of R'' and R''' is

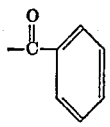

and the other of R'' and R''' is

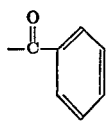

or

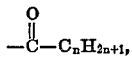

wherein $n$ is a number from 5 to 11.

2. Composition of claim 1, wherein said diester is present in said composition in an amount of from 30 to 50 parts by weight, based on 100 parts by weight of the polymer to be plasticized.

3. Composition of claim 1 wherein said diester is a diester of benzoic acid.

4. Composition of claim 1, wherein said diester contains a benzoic acid ester group and an ester group of a saturated aliphatic carboxylic acid of 6–12 carbon atoms.

5. Composition of claim 4 wherein said saturated aliphatic carboxylic acid is pelargonic acid.

References Cited
UNITED STATES PATENTS

| | | | |
|---|---|---|---|
| 1,974,810 | 9/1934 | Dvornikoff | 106—179 |
| 2,956,978 | 10/1960 | Reeves et al. | 260—31.4 R |
| 2,742,371 | 4/1956 | Albus | 106—196 |
| 2,397,942 | 4/1946 | Brookman | 260—31.4 R |

THEODORE MORRIS, Primary Examiner

U.S. Cl. X.R.

260—33.2; 106—179, 180

UNITED STATES PATENT OFFICE
CERTIFICATE OF CORRECTION

Patent No. 3,817,901    Dated June 18, 1974

Inventor(s) Sijbrandus E. Schaafsma

It is certified that error appears in the above-identified patent and that said Letters Patent are hereby corrected as shown below:

Column 2, line 57 should be removed in its entirety; column 2, line 58 "and the other of R and R' is R'" wherein one of R" and" should read --and the other of R and R' and R'" FORMULA III wherein one of R" and--. Column 5, line 35 "1.442" should be --1.4442--.

Signed and sealed this 18th day of February 1975.

(SEAL)
Attest:

RUTH C. MASON
Attesting Officer

C. MARSHALL DANN
Commissioner of Patents
and Trademarks